US007367884B2

(12) United States Patent
Breeding et al.

(10) Patent No.: US 7,367,884 B2
(45) Date of Patent: May 6, 2008

(54) PHOTOELECTRIC GAMING TOKEN SENSING APPARATUS WITH FLUSH MOUNTED GAMING TOKEN SUPPORTER

(75) Inventors: John G. Breeding, Sedona, AZ (US); Troy D. Nelson, St. Michael, MN (US); James B. Stasson, Chanhassen, MN (US); James P. Helgesen, Eden Prairie, MN (US)

(73) Assignee: Shuffle Master, Inc., Las Vegas, NV (US)

( * ) Notice: Subject to any disclaimer, the term of this patent is extended or adjusted under 35 U.S.C. 154(b) by 0 days.

(21) Appl. No.: 10/615,350

(22) Filed: Jul. 8, 2003

(65) Prior Publication Data

US 2004/0009799 A1 Jan. 15, 2004

Related U.S. Application Data

(63) Continuation of application No. 09/553,075, filed on Apr. 20, 2000, which is a continuation-in-part of application No. 08/866,516, filed on May 30, 1997, now abandoned, application No. 10/615,350, and a continuation of application No. 08/998,473, filed on Dec. 26, 1997, now Pat. No. 6,229,534, which is a continuation-in-part of application No. 08/567,001, filed on Dec. 4, 1995, now abandoned, and a continuation-in-part of application No. 08/388,292, filed on Feb. 14, 1995, now Pat. No. 5,544,892, which is a continuation-in-part of application No. 08/043,413, filed on Apr. 6, 1993, now Pat. No. 5,417,430, which is a continuation-in-part of application No. 08/023,196, filed on Feb. 5, 1993, now Pat. No. 5,288,081, said application No. 08/567,001, and a continuation-in-part of application No. 08/041,850, filed on Apr. 2, 1993, now Pat. No. 5,472,194.

(51) Int. Cl.
*A63F 1/00* (2006.01)
*A63F 13/00* (2006.01)

(52) U.S. Cl. ............................ 463/25; 463/13; 463/29; 273/274; 273/309

(58) Field of Classification Search .................. 463/25, 463/29, 26, 27, 13; 273/274, 309
See application file for complete search history.

(56) References Cited

U.S. PATENT DOCUMENTS

| | | | |
|---|---|---|---|
| 3,939,953 | A | 2/1976 | Miyazawa |
| 4,305,586 | A | 12/1981 | Richards |
| 4,483,431 | A | 11/1984 | Pratt |
| 4,488,431 | A | 12/1984 | Miga |
| 4,593,904 | A | 6/1986 | Graves |
| 4,651,997 | A | 3/1987 | Wood |
| 4,652,998 | A | 3/1987 | Koza et al. |
| 4,659,087 | A | 4/1987 | Shen et al. |
| 4,743,022 | A | 5/1988 | Wood |

(Continued)

FOREIGN PATENT DOCUMENTS

| | | |
|---|---|---|
| CA | 2195325 | 10/1995 |
| DE | 44 39 502 | 9/1995 |
| EP | 0 443 420 | 1/1995 |

*Primary Examiner*—Benjamin Layno
(74) *Attorney, Agent, or Firm*—Mark A. Litman & Associates, P.A.

(57) ABSTRACT

The present invention relates to a gaming apparatus comprising a gaming table with a gaming surface having at least one predetermined location for receiving a gaming token. A gaming token supporter is mounted at each of the at least one predetermined location for receiving a gaming token on the gaming surface of the gaming table such that the gaming token supporter is flush with the gaming surface and forms a gaming token receiving location. A photoelectric sensor for each gaming token supporter that emits and receives modulated radiation is mounted to the gaming table such that each sensor is aligned with and in sensing proximity to a gaming token supporter.

14 Claims, 8 Drawing Sheets

U.S. PATENT DOCUMENTS

| | | | | |
|---|---|---|---|---|
| 4,756,531 | A | | 7/1988 | DiRe et al. |
| 4,813,675 | A | | 3/1989 | Greenwood |
| 4,836,546 | A | | 6/1989 | DiRe et al. |
| 4,836,553 | A | | 6/1989 | Suttle et al. |
| 4,837,728 | A | | 6/1989 | Barrie et al. |
| 4,842,276 | A | | 6/1989 | Darby |
| 4,861,041 | A | | 8/1989 | Jones et al. |
| 4,882,473 | A | | 11/1989 | Bergeron et al. |
| 4,906,005 | A | | 3/1990 | Manabe |
| 4,948,134 | A | | 8/1990 | Suttle et al. |
| 5,019,973 | A | | 5/1991 | Wilcox et al. |
| 5,042,635 | A | | 8/1991 | Bell |
| 5,042,818 | A | | 8/1991 | Weingardt |
| 5,078,405 | A | | 1/1992 | Jones et al. |
| 5,098,107 | A | | 3/1992 | Boylan et al. |
| 5,112,060 | A | | 5/1992 | Jones |
| 5,114,155 | A | | 5/1992 | Tillery et al. |
| 5,116,055 | A | | 5/1992 | Tracy |
| 5,167,413 | A | | 12/1992 | Fulton |
| 5,248,142 | A | | 9/1993 | Breeding |
| 5,275,400 | A | | 1/1994 | Weingardt et al. |
| 5,275,415 | A | | 1/1994 | Wisted |
| 5,288,077 | A | | 2/1994 | Jones |
| 5,288,081 | A | | 2/1994 | Breeding |
| 5,364,104 | A | | 11/1994 | Jones et al. |
| 5,377,994 | A | | 1/1995 | Jones |
| 5,382,025 | A | | 1/1995 | Sklansky et al. |
| 5,393,067 | A | | 2/1995 | Paulsen et al. |
| 5,417,430 | A | | 5/1995 | Breeding |
| 5,472,194 | A | | 12/1995 | Breeding et al. |
| 5,544,892 | A | | 8/1996 | Breeding |
| 5,735,742 | A | | 4/1998 | French |
| 5,836,583 | A | | 11/1998 | Towers |
| 5,909,876 | A | | 6/1999 | Brown |
| 5,924,926 | A | | 7/1999 | Brown |
| 6,299,534 | B1 | | 10/2001 | Breeding et al. |
| 6,446,864 | B1 | * | 9/2002 | Kim et al. .................. 235/382 |

* cited by examiner

PHOTOELECTRIC GAMING TOKEN SENSING APPARATUS WITH FLUSH MOUNTED GAMING TOKEN SUPPORTER

This application is a continuation of application Ser. No. 09/553,075, filed Apr. 20, 2000, which in turn is a continuation-in-part of application Ser. No. 08/866,516, filed May 30, 1997, now abandoned; which is a continuation of Ser. No. 08/998,473, filed Dec. 26, 1997, now U.S. Pat. No. 6,299,534; and which is a continuation-in-part of application Ser. No. 08/567,001, filed Dec. 4, 1995, now abandoned, and a continuation-in-part of application Ser. No. 08/388,292, filed on Feb. 14, 1995, now U.S. Pat. No. 5,544,892, which is a continuation-in-part of application Ser. No. 08/043,413, filed on Apr. 6, 1993, now U.S. Pat. No. 5,417,430, which is a continuation-in-part of application Ser. No. 08/023,196, filed on Feb. 25, 1993, now U.S. Pat. No. 5,288,081, said application Ser. No. 08/567,001, filed Dec. 4, 1995 is a continuation-in-part of application Ser. No. 08/041,850, filed on Apr. 2, 1993, now U.S. Pat. No. 5,472,194.

BACKGROUND OF THE ART

1. Field of the Invention

The present invention generally relates to cardroom gaming involving multi-tiered wagering. More particularly, it relates to a gaming apparatus with a photoelectric sensing device having a gaming token supporter that is flush mounted to a game playing surface.

2. Background of the Art

Cardroom gaming involves many games, including multi-tiered wagering games. Such games provide a player with the opportunity to place a side bet on an additional game played in conjunction with a basic or underlying game. These cardroom games may be located at a plurality of remote locations and may be connected to each other to provide a large number of players an opportunity to play for a large common cash prize.

U.S. Pat. No. 5,393,067 to Paulsen et al. ("Paulsen") discloses a coin acceptor for use in a prior art apparatus for automatically sensing the presence of gaming tokens used in cardroom gaming. The Paulsen coin acceptor is a circular disk the under side of which is placed directly on top of the conventional felt on the table. The disk has a concentric, circular recess in its upper side that is shaped to accept the coin. The outer periphery of the disk is frustoconically shaped and extends from about the under side of the upper side at an appropriately shallow angle of no more than 30° so that players can readily slide a coin along the felt, up the frustoconical ramp of the disk, and into the recess to place a bet. A coin acceptor of the type disclosed in Paulsen has several problems: (1) inconveniences the dealer when he/she is clearing the table; (2) slows down the number games that may be played in a given period of time, thereby reducing the potential revenue at a particular table; and (3) may reduce the longevity of clay gaming tokens.

First, when the dealer is clearing the table, the recess in which the coin is placed inconveniences the dealer because the dealer cannot sweep all the gaming tokens off the table. Because of the recessed coin acceptor, the dealer must individually remove each gaming token located in a coin acceptor. Thus, a coin support structure which will allow the dealer to more conveniently remove the coins from the gaming table would be very helpful in the cardroom gaming industry.

Second, cardroom gaming facilities want to provide players with as many opportunities to place bets as possible. In a given period of time, if the number of hands played at a table is reduced because it takes the dealer more time to remove coins from recessed coin acceptors after each played game, then less hands are played at the table, thereby reducing the number of potential bets that could be placed at the table. Clearly, a coin support structure that enables a dealer to quickly remove the coins from the table and thereby play more hands is highly desirable.

Third, some casinos use clay gaming tokens. In use, these clay gaming tokens may be slid into the recess. When a gaming token is slid into the recess, the gaming token absorbs the impact of the gaming token being pushed against the side of the recess. Over a period of time, this frequent, periodic, impact placed on a clay gaming token may cause the clay gaming token to chip, thereby rendering the clay gaming token unusable. Thus, an apparatus which may increase the longevity of a gaming token would be desirable to a casino.

Also, currently, some gaming token detecting apparatuses use metal detecting sensors. One problem with such apparatuses is that they cannot be used in a casino that does not use gaming tokens that contain metal, such as casinos that use clay gaming tokens. Consequently, an apparatus that detect non-metallic gaming tokens but yet enables fast play would be desirable.

SUMMARY OF THE INVENTION

The present invention relates to a gaming apparatus comprising a gaming table with a gaming surface having at least one predetermined location for receiving a gaming token. A gaming token supporter is mounted at each of the at least one predetermined location for receiving a gaming token on the gaming surface of the gaming table such that the gaming token supporter is flush with the gaming surface and forms a gaming token receiving location. A photoelectric sensor for each gaming token supporter is mounted to the gaming table such that each sensor is aligned with and in sensing proximity to a gaming token supporter.

One object of the present invention is to provide an apparatus which allows a dealer to conveniently remove gaming tokens from the table.

DETAILED DESCRIPTION OF THE INVENTION

For this description of the preferred embodiment, the gaming token supporter of the present invention will be described in the context of the multi-tiered gaming apparatus used in conjunction with a table card game known as,"LET IT RIDE®," as disclosed in U.S. patent application Ser. No. 08/023,196, filed Feb. 21, 1993, U.S. Pat. No. 5,288,081, assigned to the assignee of the present invention and incorporated by reference herein. However, the gaming token supporter and the multi-tiered gaming apparatus disclosed herein can be used with other games, and the present invention is not limited to use with the game disclosed in this description of the preferred embodiment.

Figure 1:
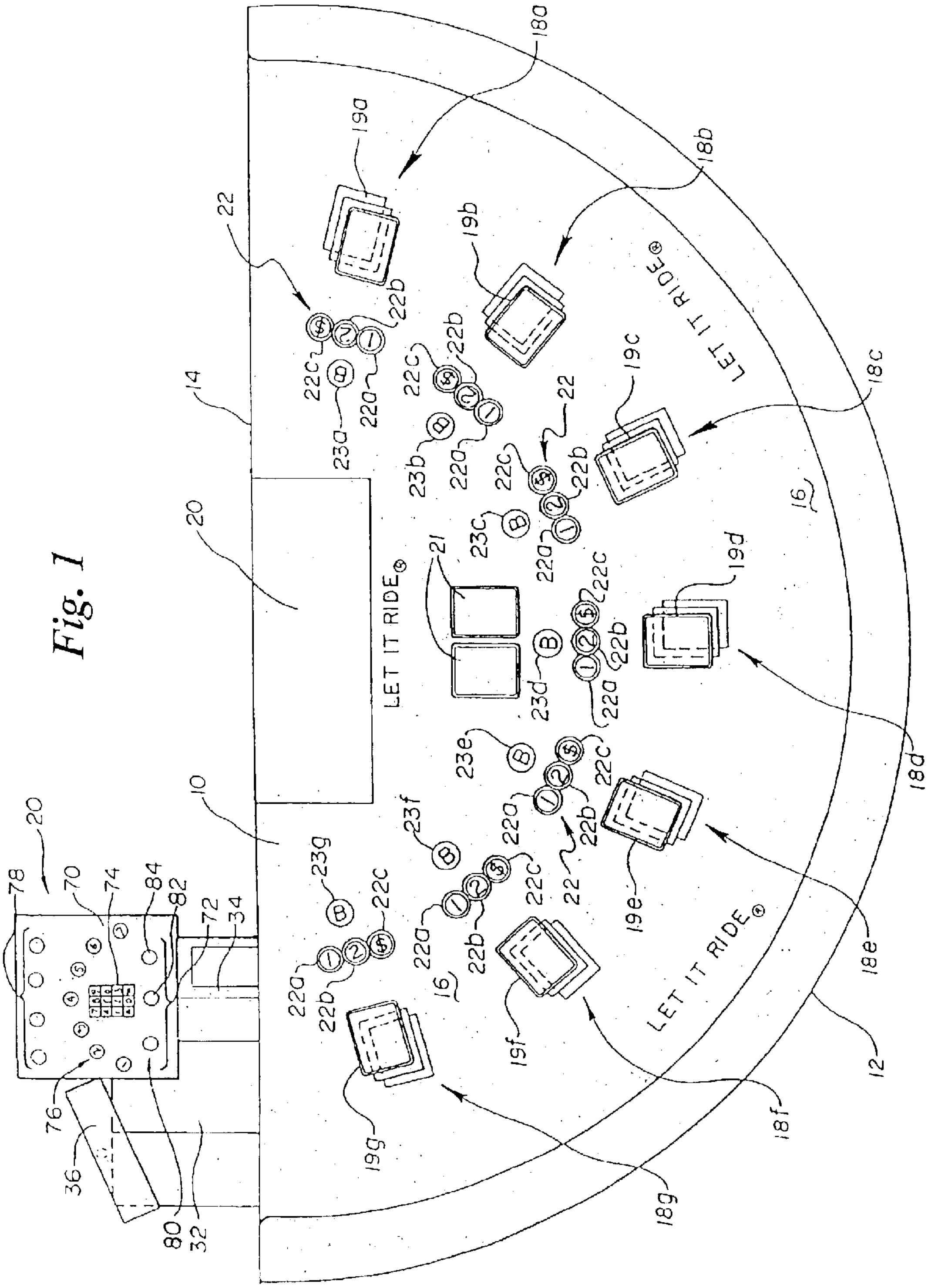
FIG. 1 depicts the table layout and apparatus used in playing a wagering game.

Referring to FIG. 1, the apparatus of the present invention includes a gaming structure which may be a typical casino gambling or gaming table 10. The table 10 has a curved side 12 for accommodating up to seven players and a straight side 14 for accommodating the dealer. The table 10 has a flat surface 16 having a top and a bottom. The top of surface 16 is covered with felt or other appropriate material, thereby forming a gaming surface. Although seven playing positions or locations 18*a*–*g* for individual players are provided, it is not essential to the game that exactly seven persons play and as many as sixteen players or as few as one may participate. For casino play, a field of seven players provides for a game that is easily manageable by the dealer and house, and one in which the individual players feel more involved. A house dealer position 20, including an area suitable for displaying the dealer's common cards 21, is provided.

Each table 10 has pre-determined locations or zones for receiving gaming tokens for wagering on the basic game and predetermined locations or zones for receiving gaming tokens for wagering on the additional games at each player station. As shown in FIG. 1, each of the playing positions or stations 18*a*–*g* includes a wagering zone 22, comprising three separate and distinct wagering or betting areas 22*a, b, c,* for receiving or placing a wager in the basic game. Each position 18*a*–*g* also includes a card area 19*a*–*g* for receiving and displaying cards dealt to the player occupying the position. A suitable wagering area or apparatus for receiving or indicating a wager in the additional game, playoff or tournament, is represented at area 23*a*–*g*. The wagering areas 22*a, b, c* and 23*a*–*g* receive appropriate wagering indicators or settling means such as gaming tokens or chips (not shown).

At one side of the dealer station 20, the apparatus for playing the multi-tiered game may include a microprocessor or computer controlled shuffling machine 32 supported by a table extension 34. The shuffling machine 32 may be of the type disclosed in U.S. Pat. No. 4,807,884, the disclosure of which patent is incorporated herein by reference. The shuffling machine 32 may include a dealing module for automatically and sequentially dealing cards and also may include a display means for displaying wagered amounts, the identity of winning players, or other game related information, including the prize amount.

Figure 2:
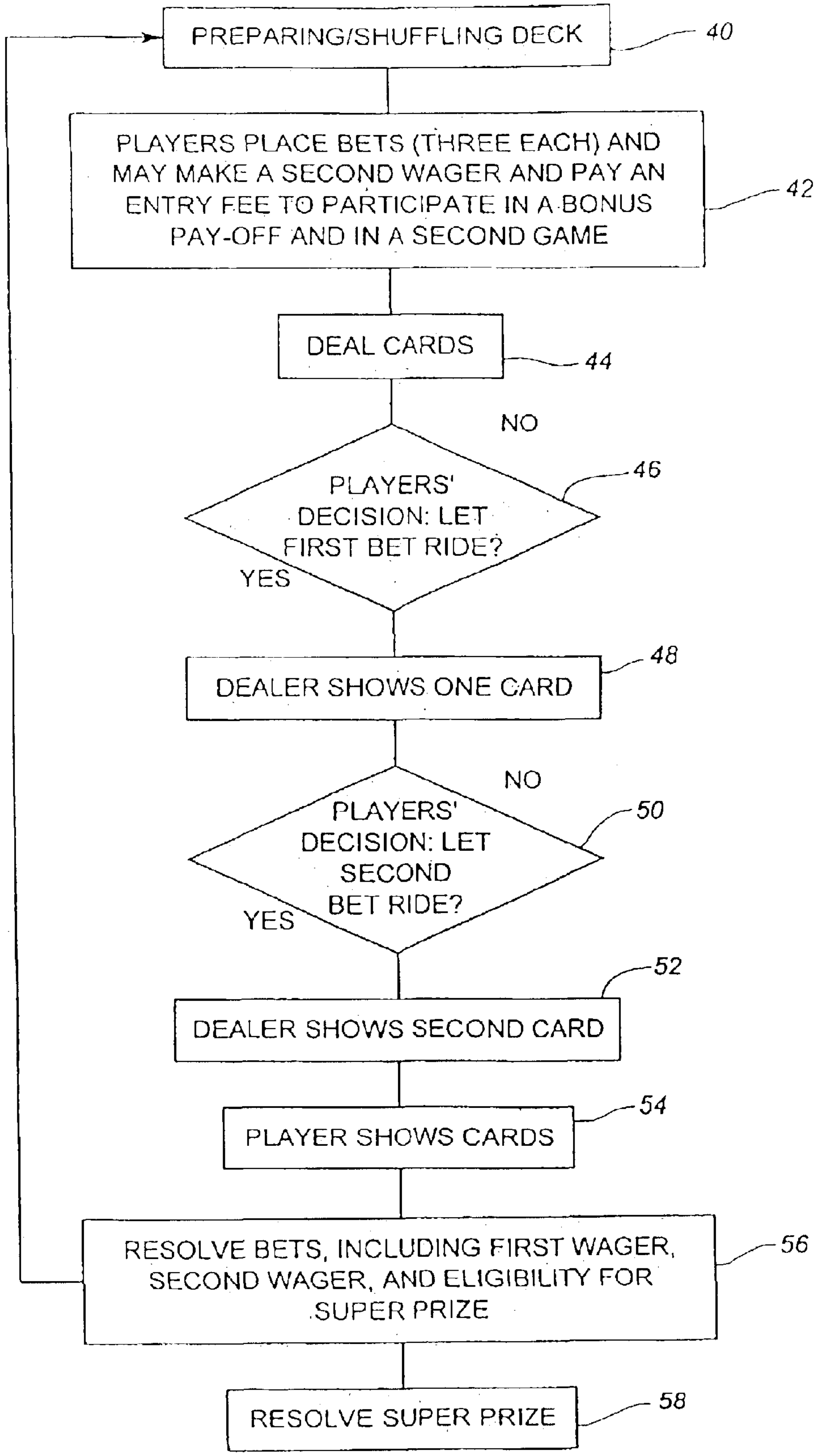
FIG. 2 is a block diagram representing the flow of play in the wagering game.

Referring to the flow diagram of FIG. 2, the initial step in playing the basic game LET IT RIDE® is preparing or shuffling a deck of cards, represented at block 40, by activating the shuffling machine 32 or by hand-shuffling a deck to provide a shuffled deck. Next, the players place a three-part initial wager, block 42, by putting equal amounts in each of the three betting areas 22*a, b, c.* Two of the parts of this initial wager, the parts placed in wagering area 22*a* and 22*b,* are retrievable at the option of the player. The third portion placed in area 22*c* is a nonwithdrawable bet. Players may also place an optional additional wager or extra fee, block 42, to participate in an additional game. After the placing of the wagers by each player, the cards are dealt, block 44, three cards being dealt down to each player and two cards are dealt down in front of the dealer.

The players inspect or "sweat" their cards in preparation for reaching decision block 46. At decision block 46, the players are queried by the dealer about whether the first part of the initial wager, the part placed in wagering area 22*a,* should be left or whether the player wishes to withdraw that portion of the wager. Each player makes the decision at decision block 46 on the basis of the three cards forming the player's incomplete hand at this point. Once each player has been queried and has decided, whether or not to let the first portion of the bet ride, and those bets the player chooses to retrieve or remove are physically removed from area 22*a* and returned to the player, the dealer shows one of the down common cards, as represented at block 48. Now, each player has four cards to consider, the three cards dealt to that player originally and the single common card showing on the table 10. Each player must then decide whether to let the second part of the initial wager ride or whether to withdraw it from the game. After each player is queried and decides what to do with regard to the second part of the bet, and those bets to be withdrawn are physically removed from area 22*b* and returned to the player, the dealer reveals the second common down card, as represented at block 52. Each player now has a five card hand comprised of the three cards each player was originally dealt plus the two revealed common cards. The third bet, the bet placed at wagering area 22*c,* is a nonretrievable portion of the initial bet and the flow of the basic game proceeds to block 54 wherein the players show or reveal their three cards to the dealer.

The dealer resolves each player's initial wager (which includes all three parts, the second and third parts or only the third part, depending on the player's choices during play of the hand) based on the five card hand at block 56 and determines what payout, if any, the player is entitled to receive according to the payout schedule at the particular gaming table or casino. Bets on non-winning hands are collected by the dealer or house. The hand is then over, and the flow of the basic game returns to block 40, preparing and shuffling the deck for a new hand.

The award or payoff is given for each part of the initial or basic game bet that was allowed to ride to the end of the hand and for the nonwithdrawable part of the bet. A typical pay table would be as follows:

| | | |
|---|---|---|
| Pair, Tens or Better | 1–1 | (even money) |
| Two Pairs | 2–1 | |
| Three of a Kind | 3–1 | |
| Straight | 5–1 | |
| Flush | 8–1 | |
| Full House | 11–1 | |
| Four of a Kind | 50–1 | |
| Straight Flush | 200–1 | |
| Royal Flush | 1,000–1 | |

With regard to the additional wagering game and method, along with placing an initial game wager, block 42, the players may place an additional wager or entry fee, thereby placing an optional side bet of a fixed, predetermined amount to become eligible to win a bonus pay-off and to participate in a tournament to become eligible to win a prize (the basic game and the additional wagering game are collectively referred to as the "multi-tiered wagering game"). It is this wager that is sensed and registered by the proximity switch apparatus of the present invention, although the invention could be utilized to register other wagers as well. The game flow then proceeds as represented in blocks 44–56. At block 56, along with resolving each player's basic game bet, the dealer also resolves the second wager or side bet which includes eligibility to continue in a playoff or tournament game to win a prize. The second wager is resolved by the dealer immediately paying out a bonus payout to participating players according to a table. A typical bonus pay table would be as follows:

| | |
|---|---|
| Straight | $25.00 |
| Flush | $50.00 |
| Full House | $100.00 |
| Four of a Kind | $200.00 |
| Straight Flush | $2,000.00 |
| Royal Flush | $20,000.00 |

Each player participating in the additional wagering game and having a final hand comprising, in the preferred embodiment, the highest one hundred winning hands registered by participating players over a given period, becomes eligible to continue tournament play to win a prize, represented at block 58.

The basic wagering game and additional game may be a lottery type game, any suitable wagering game or any suitable random process through which eligible finalists are selected and through which one of the eligible finalists is identified as the prize winner. The basic game and the additional game which culminates in a winner of the prize may be different games, and the second game may be played at a different place than the basic game.

The super prize or prize is a fixed amount set at least prior to the commencement of the second game and may be comprised of the optional second game wagers or entry fees, or a portion thereof, accumulated for a selected period. Where the prize is comprised of accumulated entry fees or side bets, or a portion thereof, the prize total may increase until the occurrence of a selected event such as the prize reaching a predetermined amount, a predetermined period of time has elapsed, or a predetermined number of finalists has been identified. After the occurrence of the selected event, but prior to the commencement of the second game, the prize amount is made known to the players. Where a fixed amount of money is allocated to fund the prize prior to the commencement of the additional game, the prize amount can be made known to the players prior to the commencement of the basic game.

The selected period for funding a prize must insure that a substantial number of players qualify for winning the prize, and that a substantial prize, for example, a million or multi-million dollar prize, accumulates. Ideally, the selected period is at least one month, but a typical period would be three months, particularly if the funding program or schedule set forth below is followed. Eligible finalists in the second game, i.e., all the eligible basic game players having a final hand comprising the highest one hundred hands, are accumulated during a qualification period equal to the prize accumulation period. If no royal flush has been achieved during the selected accumulation period, the next highest winning hands are used to determine eligibility for the second game. Another method that could be used to determine eligible finalists in the second game would be to have each player registering a royal flush over a given time period to become eligible. Once the selected event has occurred the prize or prize pool is established and the prize amount is fixed.

A typical funding program for a prize when it is comprised of accumulated fixed side bets or entry fees may be outlined as follows. A one dollar ($1.00) fixed side bet or entry fee could be required to participate in the bonus pay-off and the second game. Of this amount, forty-five cents ($0.45) could be used to fund immediate bonus payouts to players, the bonus payouts being based on a random outcome or certain poker rankings as set forth above. Fifty-five cents ($0.55) could be used to fund the prize.

The multi-tiered wagering game and method is not limited to being played with five card stud poker games, but may be applied or used with other appropriate wagering games such as other poker games or games of chance. The method for the multi-tiered wagering game does not require a shuffling machine 32, dealing module 33 or a display means 36. However, when the multi-tiered wagering game is played with a card game, these features facilitate and expedite the play of the game as well as add security (game protection), efficiency, and interest. The fee for participation in the additional wagering game may be in an amount other than one dollar, and the funding schedule set forth above may be varied. Where the prize is funded by accumulated fixed side bets or entry fees, the accumulation period may also be varied, as long as a prize sufficient to interest players accumulates. For example, the accumulation period may be a selected time period, may be based on the accumulation of a particular amount of money, or may be based on the accumulation of a certain number of finalists.

The following instructions set forth the conceptual design and procedures for a tournament in a casino environment, wherein the prize is funded by a portion of the accumulated entry fees:

Before the basic LET IT RIDE® game is played, players may elect to pay a $1 entry fee per hand to participate in the LET IT RIDE® Tournament. If they pay the entry fee and get a straight or higher, they will be eligible for bonus payments as follows:

| | |
|---|---|
| Royal Flush | $20,000 |
| Straight Flush | $2,000 |
| Four of a Kind | $200 |
| Full House | $100 |
| Flush | $50 |
| Straight | $25 |

The payout numbers are for illustration purposes only and in actual practice could be higher or lower.

Example: If a player makes three $5 bets on LET IT RIDE® and hits four of a kind, he will receive $750 for that bet (50 to 1). If he had also paid the $1 tournament entry fee for that hand, he would receive a $200 bonus for a total payout of $950.

If a player hits a royal flush, he will be paid 1,000 to 1 for his basic bet. Again, using three $5 bets as any example, the player would win $15,000 for his basic bet and, if he had paid the $1 tournament entry fee for that hand, he would receive a $20,000 bonus for a total payout of $35,000.

The hit frequency shows that 45¢ of the $1 entry fee will be required to finance the bonus payment schedule. The remaining 55¢ will be put into the prize pool.

The first round of the tournament will last for a predetermined length of time (e.g., three months). At the end of that period, the players with the one hundred highest hands (plus ties) will qualify for round two of the tournament. Rounds two through five (the final round) would take place over a two day period at a host casino. All of the qualifiers that return and participate in round two of the tournament will receive a bonus (i.e., $5,000) regardless whether they win or lose.

Two Day Playoff:

Day One/Round Two—Each player will be given an equal amount of nonredeemable chips in various denominations. At the end of 50 hands, the 50 players (plus ties) with the highest winnings will advance to round three and will receive another bonus (i.e., $10,000).

Day One/Round Three—The 50 remaining players will reassemble at the tables and again be issued an equal amount of non-redeemable chips. The winnings from the previous round will not be carried forward. After 50 hands have been played, the 25 players (plus ties) with the highest winnings will advance to round four and receive another bonus (i.e., $15,000).

Day Two/Round Four—The 25 remaining players will return to the tables and will be issued an equal amount of chips. After 50 hands, the five players with the most money will advance to round five (the final round). Since the final round cannot have more than five players, a ten hand tie-breaker round will be played between players trying for the fifth seat.

Day, Two/Round Five (Final Round)—The five finalists will receive-an equal number of chips and play at the same table. At the end of 50 hands, the players are ranked according to the total value of the chips they have accumulated. The payouts will be distributed as follows:

| | |
|---|---|
| 5th Place | $1,000,000 |
| 4th Place | $1,500,000 |
| 3rd Place | $2,000,000 |
| 2nd Place | $2,500,000 |
| 1st Place | Fixed amount larger than second place or balance of prize pool |

The balance is the balance of the prize pool after all other prizes have been deducted. While this balance is not fixed at the beginning of play of the basic game, it is fixed prior to the beginning of round two of tournament play. The payout numbers are for illustration purposes only and in actual practice could be higher or lower.

Irregularities in the Tournament:

1. At the end of each round, only players with chips remaining are eligible for the next round, e.g., if only forty players have chips remaining after round two, then only those forty players may advance to round three.

2. If, during the final round, several players lose all of their chips before the round is over, they will be ranked in the order they lost their chips, e.g., the first player to lose all his chips will take seventh place, the second player to lose his chips will be in sixth place, etc.

3.If two or more players lose their chips on the same hand, those players will tie and the prize money will be divided equally, e.g., if the first two players to lose all of their chips do so on the same hand, they would tie for fourth place. The prize money for the 4th and 5th places would be added together and divided equally among the two players.

Dealing Procedures

1. Before proceeding with each hand, the dealer asks "any tournament entries?" and allows each player time to place his entry fee in the designated area. The player may place either his basic game wager or his optional wager and tournament entry fee on the table first—the order does not matter.

2. The dealer ensures that the red entry fee lamp, or other suitable display means, on the gaming table is on for each player who has placed an optional wager and an entry fee.

3. The dealer then verifies the accuracy of each player's bet by confirming that an equal amount is placed on each of the three wagers.

4. The dealer now touches a "no more fees" switch or the "Begin Game" switch on the table control panel. Once this is done, players may not change their wagers or entry fees in any way.

5. The dealer collects the optional wager and entry fees and places them in the chip rack. (Without the dealer having to take any action, once the last coin from the optional wagers and entry fees is collected, a signal is sent to the shuffler and it automatically moves the freshly shuffled deck forward to the pre-count counting position.)

6. The dealer takes the deck from the discard rack and places it in the shuffling area of the automatic shuffler. (Once the cards are placed in the shuffling area, the shuffler automatically counts the first three cards into the forward position.)

7. The dealer takes the three cards from the front of the shuffler and places them face down on the table in front of the first player on his left, spreading the cards to verify that exactly three cards were dealt.

8. The dealer now takes the next three cards from the front of the shuffler and places them face down in front of the second player from his left, spreading them out to verify the number of cards. The dealer follows this procedure clockwise around the table until each player who has made a wager receives a three card hand.

9. After each player has received three cards, the dealer places the next three cards from the shuffler face down in front of himself. (Although only two cards are used, the automatic shuffler is programmed to dispense three cards). These cards remain in a stack so that the two bottom cards are hidden by the top card. The stack is placed in the left hand rectangle of the two rectangles on the layout in front of the dealer.

10. The dealer touches the "card count" switch on the shuffler. The shuffler counts the remaining cards while moving them to the forward position. Before the dealer picks up the cards, he must determine whether or not the count is accurate. If the card count light glows green, the count is accurate. If the card count light flashes red, there is a miscount.

11. In case of a flashing red light, the dealer calls a floor supervisor for instructions before proceeding (see "irregularities" below.)

12. If the card count light glows green, the dealer may remove the balance of the cards from the shuffler and place them in the discard rack.

13. While waiting for the card count light, the dealer begins the round with the first player on his left. The dealer allows each player in turn the option to reclaim his first bet or to let it ride. The dealer must not allow players to reach out and retrieve their own bets. If a player does this, the dealer should politely ask him not to do so in the future. Only the dealer can return bets to a player.

14. After the first round of options, the dealer takes the top card from the stack in front of him and places it on top of the cards in the discard rack. Then he turns over the second card, placing it face up covering the bottom card. The bottom card should not be visible.

15. Again, starting on his left, the dealer gives each player in turn the option to reclaim his second bet or to let it ride. The dealer asks the players to place their hands face down either near, against, or under their chips until the hand is over.

16. The dealer moves his up card to the right hand rectangle on the layout in front of him. The dealer then turns over his bottom card. There should now be two up cards in front of the dealer representing the community cards for the players.

17. Starting with the player on his right, the dealer turns over that player's hand and determines if it is a winning hand according to the payout schedule for the basic LET IT RIDE® game. If the player does not have a winning hand, the dealer collects the remainder of the player's wager and places it in the chip tray. If the player does have a winning hand according to the LET IT RIDE® payout schedule, the dealer pays the player the amount indicated on the schedule.

18. To determine the bonus payment, the dealer touches the key on the control panel which indicates the player's position (the light will begin to flash). The dealer touches the key representing the player's hand. The dealer touches the enter key. The dealer then looks at the instruction window for the next step (i.e., whether to pay the player or notify a floor supervisor, what amount to pay, etc.).

19. Once a bonus has been paid to a player and approved by the appropriate casino authorities, the dealer collects that player's cards and places them face down in the discard rack. The dealer touches the enter key again. The dealer then moves on to the next player from his right (counter-clockwise) and follows the same procedures outlined in steps 18 through 21.

20. When the dealer finishes with the last player (the first player on his left), he collects those cards and the two community cards in front of the dealer and places, them face down in the discard rack. The dealer then touches the "Game Over" switch on the control panel.

Irregularities in Dealing Procedures:

1. Entry Fee Light:

If a player puts up his $1 wager (in the form of a metal gaming token provided by the casino) for his entry fee and his entry fee light does not activate, the dealer calls a floor supervisor for instructions. The supervisor then closes that position for play.

2. Too many or Too Few Cards in Deck

If the automatic card count light on the shuffler is flashing red after it has counted out the cards, the dealer calls a floor supervisor. The floor supervisor removes the cards from the discard rack and does a hand count on the table (adding in the cards that have been dealt to the players) to determine whether the card count is accurate. If the count results in fewer or more than 52 cards, the round is declared a misdeal and all of the cards are collected. The floor supervisor removes the deck from the game and seals it to be held for further examination, if necessary. The supervisor then installs a new deck of the same color following the new deck dealing procedures.

3. Auto Shuffler Miscount:

Even if the automatic shuffler shows an accurate count, if any player has more or less than three cards, it is still considered a misdeal and a dead hand. The deck is removed and a floor supervisor is called.

4. Player Has Too Many or Too Few Cards In His Hand:

If any player has too many or too few cards (more or less than three) in his/her hand, the round will be declared a misdeal. The cards will be collected and new hands will be dealt from a new deck.

Bonus Payments and How to Pay Them

As stated previously, if a player has paid the $1 optional wager and entry fee and his hand consists of a straight or higher, he is eligible for the following cash bonus payments:

| | |
|---|---|
| Royal Flush | $20,000.00 |
| Straight Flush | $2,000.00 |
| Four of a Kind | $200.00 |
| Full House | $100.00 |
| Flush | $50.00 |
| Straight | $25.00 |

If a player has a straight ($25) or a flush ($50), the dealer pays the bonus from the chip tray upon verbal approval of the floor supervisor.

If a player has a full house ($100) or four of a kind ($200), payment is made upon approval of the pit boss.

If a player has a straight flush ($2,000) or a royal flush ($20,000), approval of the pit boss and the shift supervisor or casino manager is required before making payment.

Optional Wager and Entry Fee

Amount: $1 per hand paid prior to receiving cards.

Token: $1 value metal gaming token provided by the casino.

Since the object of round one of the tournament is to get one of the hundred highest hands dealt during the posted time period, players may enter every time they play the basic LET IT RIDE® game.

Fifty-five cents of each $1 entry fee collected by the casino is remitted to the tournament organizer. The remaining 45¢ is retained by the casino. Each casino is responsible for paying any bonuses the entrants may qualify for during round one. If the bonus awards paid by a casino are less than the amount collected, the casino is entitled to keep the money as its own. If the bonus awards paid out exceed the money collected by the casino, the casino must make up the, difference.

The 55¢ remitted to the tournament organizer is deposited into a holding account. This money constitutes the prize money available to be paid to players as they advance to rounds two through five.

Qualifying Hands

Only the player who receives a qualifying hand is allowed to advance to rounds two through five. Qualifiers for any round may not sell, donate, or in any way transfer their rights to continue in the tournament.

If a qualifier is unable to continue in the tournament for any reason whatsoever—including death—no one will be allowed to substitute for that person and continue in his place. (This rule is intended for the protection of the tournament qualifiers as well as the integrity of the tournament.)

If a player has more than one qualifying hand, only his or her highest hand will be allowed to advance to round two.

A qualifying hand may not be used in any tournament other than the one in which it is received.

Registering Qualifying Hands

In addition to the normal IRS paperwork, all straight flush and royal flush bonus winners must complete the "LET IT RIDE® Bonus Winner Form". If a player does not complete this form, then he will not be considered a qualifier for round two.

If a player who gets four of a kind and has paid the entry fee wants to register as a potential qualifier for round two, then he must complete the "LET IT RIDE® Bonus Winner Form" in full.

In addition, each player must be photographed with a Polaroid camera. The player must sign the back of the photo. The photo is submitted to the tournament organizer along with the "LET IT RIDE® Bonus Winner Form".

Upon completion of the paperwork, the pit boss or shift boss must notify the tournament organizer by phone with the following information:

Person Calling
Casino Name
City
Time
Date
Player's Name
Type of Hand
Form Number The tournament organizer must receive an original or facsimile of the form and photo within 48 hours.

The multi-tiered wagering game of the present invention, including the LET IT RIDE® game aspects thereof, might be played live with a dealer at one or more gaming tables in one or more casinos, or in casinos, homes, and other locations in interactive electronic or video form with automatic coin or betting means symbols, receptacles and payout capability, wherein appropriate symbols for cards, wagers, or score keeping would be displayed electronically.

With reference to the FIGS. 1 and 2–10, a more detailed description of the apparatus for playing the multi-tiered wagering game in conjunction with the LET IT RIDE® game follows. As shown in FIG. 1, a playing table 10 has seven player positions 18*a*–*g*. Each of the playing positions 18*a*–*g* includes a wagering zone 22, comprising three separate and distinct wagering or betting areas 22*a, b, c,* for receiving or indicating a wager in the basic game. Also, each position 18*a*–*g* includes a card area 19*a*–*g* for receiving and displaying cards dealt to the player occupying the position. A suitable wagering area or apparatus for receiving or indicating a wager and entry fee in the multi-tiered wagering game (i.e., the bonus pay-off and the second game, playoff or tournament) is represented at area 23*a*–*g*. The wagering areas 22*a, b, c* and 23*a*–*g* may be designed to receive appropriate wagering indicators or settling means such as gaming tokens or chips (not shown). Prior to each hand of the LET-IT-RIDE® game, or related table game, each player at the table 10 must decide whether to enter the multi-tiered wagering game by placing a gaming token in wagering area 23*a*–*g*. Placing a gaming token in wagering area 23*a*–*g* indicates that the player has entered the additional game which is part of the multi-tiered wagering game.

At one side of the dealer station 20, the apparatus for practicing the method of the multi tiered wagering game may include a microprocessor or computer controlled shuffling machine 32 supported by a table extension 34. The shuffling machine 32 may be of the type disclosed in U.S. Pat. No. 4,807,884, the disclosure of which patent is incorporated herein by reference. The shuffling machine 32 may include a dealing module for automatically and sequentially dealing cards and also may include a display means for displaying wager amounts, the identity of winning players, or other game related information, including the prize amount.

Also, FIG. 1 shows a dealer control panel 70. The dealer control panel 70 includes four sets of inputs: the game status inputs 72; the keypad 74; the player position inputs 76, and the winning hand inputs 78. The game status inputs 72 allow the dealer to enter information on the status of the multi-tiered game. The dealer depresses the "Begin Game" button 80 when all players at the table have made their betting selections prior to the start of each game. At this time, the player betting information is sent to the facility computer 86 (see FIG. 4).

When the game is over, the dealer depresses either the "Game Over" button 82 or the "Winner" button 84. Selection of the "Game Over" button 84 resets sensor devices 118 (which will be described later) where one sensor device 118 is aligned with and in sensing proximity to a wagering area, 23*a*–*g,* and betting for a new game is initiated. The dealer selects the "Winner" button 84 when one or more players participating in the additional game of the multi-tiered game have one of the winning hands. Next, a security code is entered on the keypad 74. For lower payout winners, the dealer will have a unique security code to enter. For the highest payout hands, the pit boss or shift manager will have a different unique security code. Therefore, one of these supervisory managers confirms the high payout hand before the information is entered and the payout is made. For example, the two different security codes are four-digit codes distributed daily.

Next, the dealer inputs the player position 18*a*–*g* of the winning hand by selecting the corresponding player position input 76 for the winning player. Finally, the dealer inputs the winning hand by selecting the appropriate winning hand input 78.

In an alternative embodiment, the keypad 74 is also used to activate or disable the multi-tiered gaming inputs 23*a*–*g,* 72, 76, 78 at a table 10. A specific four-digit code disables all of the multi-tiered game inputs 23*a*–*g,* 72, 76, 78 at the gaming table 10 and another four-digit code activates the multi-tiered gaming inputs 23*a*–*g,* 72, 76, 78 at a table 10.

Figure 3:
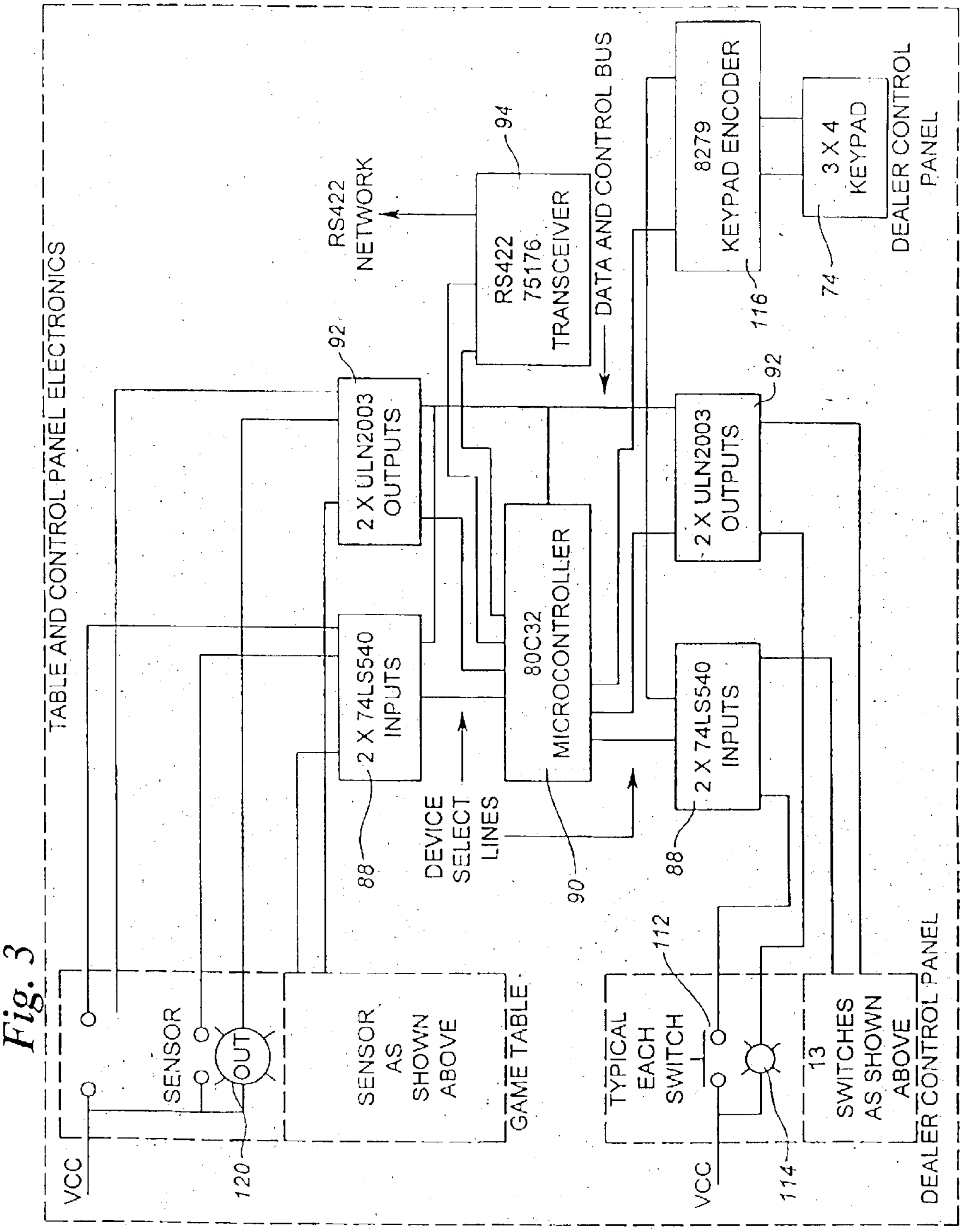
FIG. 3 is a schematic diagram of the player selection inputs and dealer control panel.

FIG. 3 shows the player input and dealer control panel circuitry. Each sensor device 118 (which will be described later in this specification), one such device is located under each of the wagering areas 23*a*–*g,* is connected through an input device 88 to a microcontroller 90. An example of input device 88 is an Inverting Octal Tristate Buffer, available from National Semiconductor, Santa Clara, Calif. 95051. The microcontroller 90 may be selected from a variety of commercially available microcontrollers such as the 80C32 microcontroller, available from Intel Corporation, Santa Clara, Calif. When the presence of a gaming token is detected by the sensor device 118, the microcontroller 90 turns on the LEDs 146 through the output device 92. When the LEDs 146 which surround the sensor light up, the LEDs 146 signal to the player and the dealer that the bet placed by the player for entry into the second game has been registered by the microcontroller 90. An example of output device 92 is a Darlington Array, available from Allegro Microsystems Inc., Worcester, Mass. 01615.

When all of the players at a table 10 have made their betting selection with regard to the additional game of the multi-tiered game, the dealer depresses "Begin Game" button 80 on the dealer control panel 70. The encoded betting information is sent from the microcontroller 90 to an RS422 transceiver 94 and, referring to FIG. 4, the encoded betting information is sent over network 96 to the facility computer 86. The facility computer 86 can be one of numerous commercially available personal computers generally having a monitor, microprocessor, information storage, and I/O ports, for example, an IBM PS/1, available from IBM, Armonk, N.Y.

Figure 4:
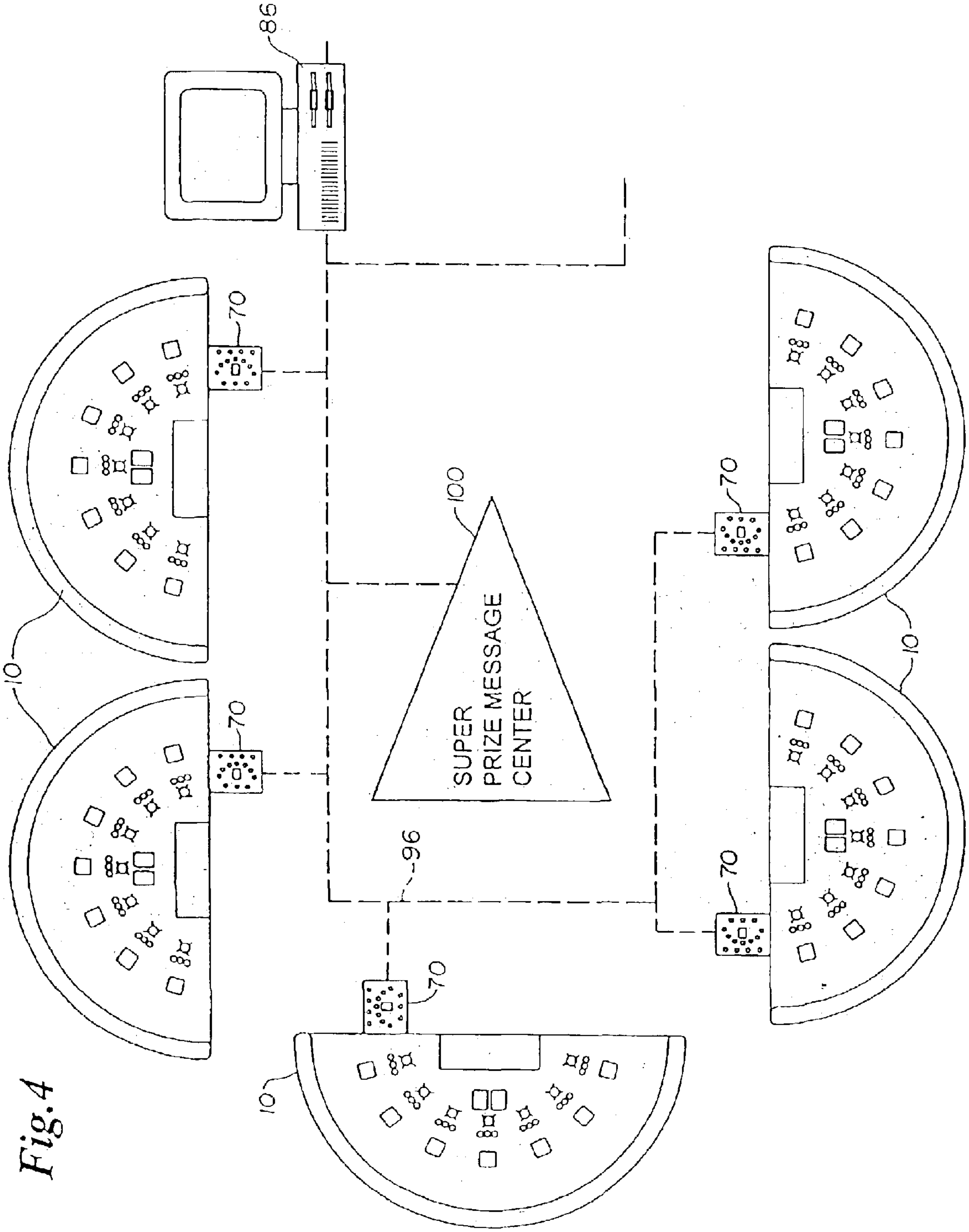
FIG. 4 shows gaming tables connected to a facility computer by a network.

As shown in FIG. 4, the facility computer 86 receives betting and winning hand information from all of the tables 10 connected to the network 96. Generally, a maximum of thirty-two devices can be connected to the facility computer 86 via the RS422 interface network. Therefore, a facility having more than thirty-two gaming tables 10 equipped for multi-tiered gaming will have more than one facility computer 86.

Figure 5:
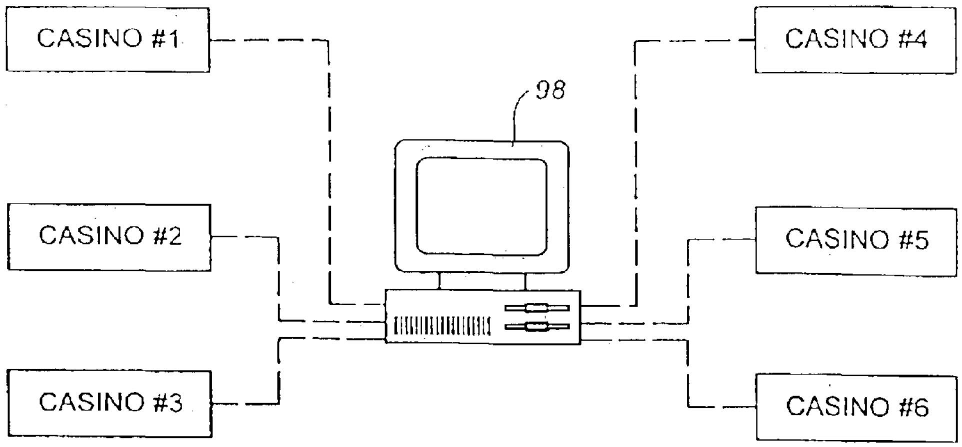
FIG. 5 shows a plurality of facility computers linked to the central computer.

As shown in FIG. 5, the facility computers 86 are electronically linked to a central computer 98 by telephone lines or other circuitry well known to one-of ordinary skill in the art. The central computer 98 may be located at a site separate from all of the facility computers 86 or co-located at one of the gaming facilities. The central computer 98 may also be one of the generally available personal computers such as the IBM PS/1 available from IBM. In an alternative embodiment of the invention, one of the facility computers 86 acts as both the facility computer 86 for a gaming facility and as the central computer 98.

The central computer 98 receives all of the betting and winning hand information from the facility computers 86 and computes the multi-tiered prize amount. The central computer 98 receives the number of bets and number and type of winners from each gaming table 10. A unique address identifies each table 10 at each gaming facility. The central computer 98 includes a data base and associated accounting software. The data base allows the central computer 98 to compare the number of actual payoffs to the anticipated number of payoffs to detect any cheating or other irregularities at any of the tables or facilities. The central computer 98 can generate a variety of accounting reports on each table or gaming facility on a daily basis. If the new prize amount is computed each time new betting or winning hand information is received by the central computer 98, then the new prize amount is sent to the facility computers 86 as soon as practicable. However, this new prize amount should be sent to the facility computers 86 at least every five minutes. It should be noted that the prize is preset for a minimum amount. Only when the betting exceeds a certain amount will this calculation affect the amount of the prize.

Figure 6:
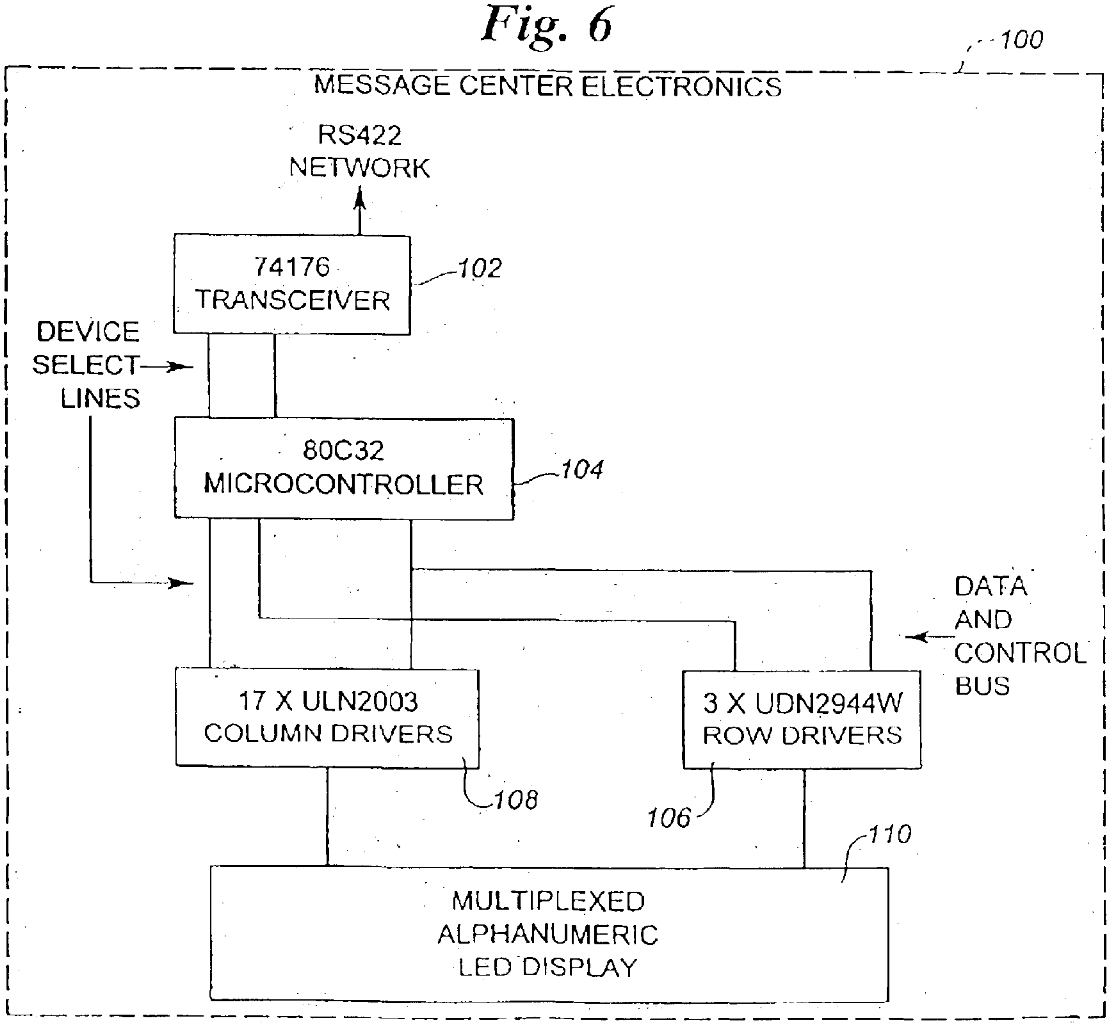
FIG. 6 is a schematic diagram of the display board.

As shown in FIG. 4, the facility computer 86 is also connected by the RS422 network to a display center 100. As shown in FIG. 6, the display center 100 includes an RS422 transceiver 102 connected to a microcontroller 104 which is the same type as used in the dealer control panel shown in FIG. 2. The facility computer 86 sends the prize amount over the network 96 to the display board microcontroller 104. The display board microcontroller 104 drives row drivers 106 and column drivers 108 to display the prize amount on a typical alphanumeric LED display 110. Column drivers 108 can be the same device as output devices 92, e.g., a Darlington Array, available from Allegro Microsystems Inc., Worcester, Mass. 01615. Row drivers 106 can be a Quad High-Current High-Voltage Source Driver, available from Allegro Microsystems Inc., Worcester, Mass. 01615.

As shown in FIG. 3, each of the game status inputs 72, player position inputs 76, and winning hand inputs 78 has a pressure-sensitive actuating switch 112 multiplexed through an input device 88 to microcontroller 90. Microcontroller 90 turns on input light 114 through output device 92 to show that the input has been selected.

At the end of the table game, e.g., "LET IT RIDE®," the dealer determines whether there are any game winners in the additional game of the multi-tiered game. For each winner the dealer selects the "Winner" button 84 on the dealer control panel 70. If the winning hand is one of the high payout hands, e.g., royal flush or straight flush, the dealer notifies either the pit boss or shift manager who confirms the winning hand and enters a security code on the keypad 74. Keypad 74 is selected from commercially available 3×4 keypads and is connected to microcontroller 90 by keypad encoder 116, e.g., Model 8279, available from Intel Corporation, Santa Clara, Calif. The dealer then depresses the player position input 76 corresponding to the player having a winning hand. Next, the dealer depresses the particular winning hand input 78, e.g. royal flush, straight flush, four of a kind, or full house. After all winning hand entries have been made, or if there were no winners for the hand, the dealer selects,the "Game Over" button 82 and the next game can be initiated.

With reference to the FIGS. 1, 3, and 7–10, a more detailed description of the apparatus of the present invention follows. As shown in FIG. 1, the gaming table 10 has wagering areas 23*a–g*, where players place a gaming token to enter the additional game of the multi-tiered wagering game. A sensor device 118, having a sensor 144 (as will be described with reference to FIGS. 7 and 8) is mounted to a gaming table 10 such that the sensor 144 is aligned with and in sensing proximity to a wagering area 23*a–g*. Each sensor 144 is within sensing proximity of a wagering area 23*a–g*, which is between 0.8 mm to 50 mm (i.e., Within 2 inches of the wagering area 23*a–g*). This distance can vary depending on the particular sensor 144 that is used. In the preferred embodiment, a sensor device 118 is mounted is below a wagering area 23,-*ag* and is mounted adjacent the bottom of the table surface 16.

As shown in FIG. 3, each of the sensor devices 118 are connected to the microcontroller 90 through inputs 88. Moreover, a lighting device 146, which is in the sensor device 118, is connected to the microcontroller 90 through the output 92, so that when the sensor device 118 detects the presence of a gaming token in the wagering area 23*a–g* it monitors, the microcontroller 90 causes the corresponding lighting device 146 to light up.

Figure 7:
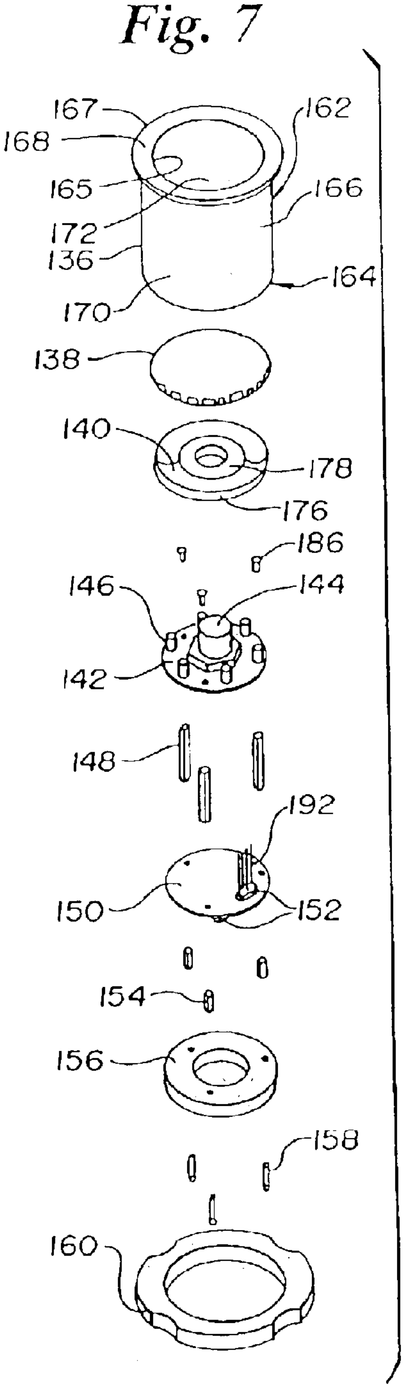
FIG. 7 is an exploded perspective view which shows the parts of a suitable proximity sensor device.
Figure 8:
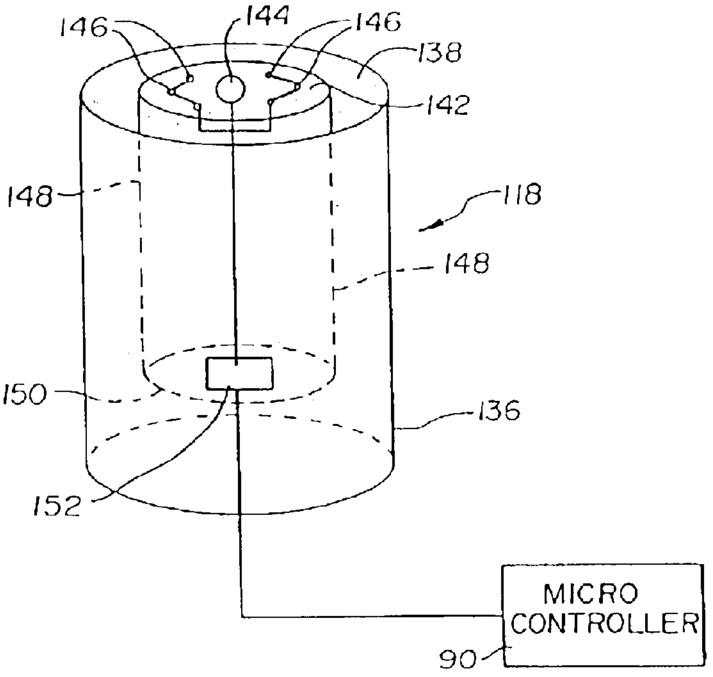
FIG. 8 is a schematic perspective view of an assembled proximity sensor device.

With reference to FIGS. 7 and 8, the sensor device 118 will be described. The sensor device 118 comprises a housing 136, a cover plate or gaming token supporter 138, a holder 140, a first board 142, a sensor 144, at least one lighting device 146, a first set of supports 148, a second board 150, a decoder connector 152, a second set of supports 154, a closing plate 156, fasteners 158, and a securing ring 160.

The housing 136 is constructed of aluminum and provides a casing for the sensor 144. The housing 136 has a top 162 and a bottom 164. In the embodiment shown in FIGS. 7 and 8, the body 166, of the housing 136 is cylindrical. The cylindrical body 166 has a circular cross section which has an inner diameter 165 and an outer diameter 167. The lip 168 located at the top 136 of the housing 136 extends into the cylindrical body. Moreover, the body 166 has an outer surface 170 and an inner surface 172. The outer surface 170 of the cylinder 166 has grooves (not shown) for receiving the securing ring 160.

The gaming token supporter or cover plate 138 may be a plastic lens. The cover plate 138 is inserted into the housing 136 such that it abuts the lip 168. This cover plate 138 protects the surface of the sensor 144 and is flush mounted to the gaming surface and forms at least a portion of a wagering area 23*a–g*.

Although, in the preferred embodiment, the gaming token supporter 138 forms a portion of the housing 136, the gaming token supporter 138 may be separate from the housing 136. However, the gaming token supporter 138 must be mounted such that the gaming token receiving surface is flush with the gaming surface of the gaming table 10 and the gaming token supporter 138 should be with aligned to and in sensing proximity with the sensor 144.

The holder 140, which is inserted into the housing 136, receives the sensor 144. The holder 140 has an outer edge

176 and an inner edge 178. The inner edge 178 forms an opening 180 which receives the sensor 144. As shown in FIG. 7, the opening 180 is circular because the sensor 144 depicted in FIG. 2 is circular. However, this opening 180 may have any shape as along as the opening 180 can receive the sensor 144. Also, the holder 140 is made of material that allows light from the lighting devices 146 to be visible through the cover plate 138.

The sensor 144 and the lighting devices 146 are fastened to the first board 142. The first board can be made of any material which has the rigidity to support the sensor 144 and the lighting devices 146. This first board 142 must have a shape which will allow the board 142 to be inserted into the housing 136. In the embodiment shown in FIGS. 7 and 8, the first board 142 is circular and has a diameter 182 which is less than or equal to the inner diameter 165 of the housing 136.

The sensor 144 may be a type of photoelectric sensor. In the preferred embodiment, an Omron photoelectric sensor having model number EE-SPZ401A is used. This type of photoelectric sensor has an infrared transmitter and an infrared receiver. In operation, the photoelectric sensor senses the presence of a gaming token on the gaming token supporter by determining whether a signal transmitted by the transmitter is reflected by the gaming token and received by the receiver. If a signal is received by the receiver, then a gaming token has been placed on the gaming token supporter. However, if the receiver does not receive a signal, then a gaming token has not been placed on the gaming token supporter. As noted in the trade literature for this photoelectric sensor, the emitted light is modulated and the modulated light is received in a retroreflective sensing mode. This provides a benefit to the performance of the system of the invention as compared to prior art systems where light from an external source is blocked tokens. As light in the casino environment can vary significantly; and as the presence of shadows by objects other than tokens (e.g., players' hands, dealer's cards, ash trays, beverage containers, shadows, etc.) Can affect levels of radiation as well as the placement of tokens, prior art systems can be more sensitive to extraneous information. By modulating the radiation emitted and identifying/receiving modulated light, the performance of the system is enhanced. Light modulation can be within any acceptable range, such as at least 1 Hz to 1000 Hz or more. The standard Omron photoelectric sensor having model number EE-SPZ401A has a frequency of greater than 1 Hz (e.g., 100 Hz) and less than 1000 Hz.

Alternatively, a type of photoelectric sensor that operates on the basis of detecting the presence or absence of light may be used. In this type of a photoelectric sensor,.the photoelectric sensor operates based on light sensed by the photo electric sensor. Ambient light sensed by the photo electric sensor through the gaming token supporter 138. This sensed ambient light turns on the photoelectric sensor. When a gaming token is placed on the game token supporter 138, ambient light is cut off, which causes the photo electric sensor to turn off. This change in the state of the photoelectric sensor enables the decoder to detect the presence of a gaming token in the wagering area.

Also, these sensors 144 are mounted in sensing proximity to a gaming token supporter and, thereby, a wagering area 23*a*–*g*. Generally, a sensor 144 may be within 2 inches of the wagering area 23*a*–*g* the sensor 144 is monitoring. The actual distance between the sensor 144 and the wagering area 23*a*–*g* varies based on the selection of a sensor 144.

The lighting device 146 may be any type of light producing element. In the preferred embodiment, a light emitting diode ("LED") is used. In fact, as shown in FIGS. 7 and 8, six LEDs are used in the present invention. This lighting device 146 is not necessary for detecting the presence of a gaming token. However, they provide (1) a visual indication to the dealer and the player that a bet has been registered; and (2) an easy target for the cameras monitoring a table 10 so that the computer's registration of a bet can be visually verified by the camera.

The sensor 144 is secured to the first board by a bolt 82 (shown in the inset, to FIG. 8). The LEDs may be secured to the first board 142 by simply placing them in the openings created in the first board 142 for receiving such devices 146.

A second board 150 is attached to the first board 142 by the first set of supports 148. The supports are aluminum supports which are secured to the first plate 142 by screws 186. The second board 150 has a first side 188 and a second side 190. A decode connector 152 is connected to the second side 190 of the second board 150. The sensor 144 and the lighting devices 146 are electrically connected to the decode connector 152 via the connector 192.

A closing plate 156 having a shape which will conform to the shape of the housing 136 is secured to a second set of supports 154. This closing plate 156 will have an opening 194 so that the electrical connection from a decoder can be connected to the decoder connector 152. This electrical connection will allow a decoder such as a microcontroller 90 to read the sensor 144 and transmit the information to the facility computer 86, which may tie several gaming tables and video gaming machines together or which may tie several gaming facilities which may have table gaming and/or video gaming together.

The decoder connector 152 is a modular connector which allows an electrical connector to be plugged into the connector 152. The securing ring 160 secures the sensor device 118 to the table 10 so that the sensor 144 is aligned with a wagering areas 23*a*–*g* corresponding to a player position 18*a*–*g*. In the preferred embodiment, the sensing apparatus will be located below each one of the wagering areas 23*a*–*g* and located adjacent to the bottom of the table surface 16, such that the sensor device 118 is aligned with a wagering area 23*a*–*g*.

One advantage of this modular construction of the apparatus for sensing the presence of a gaming token is that the apparatus can be easily maintained. The apparatus is mounted to the gaming table 10 such that it is easily accessible, thereby, allowing for easy removal and replacement of the module.

Figure 10:
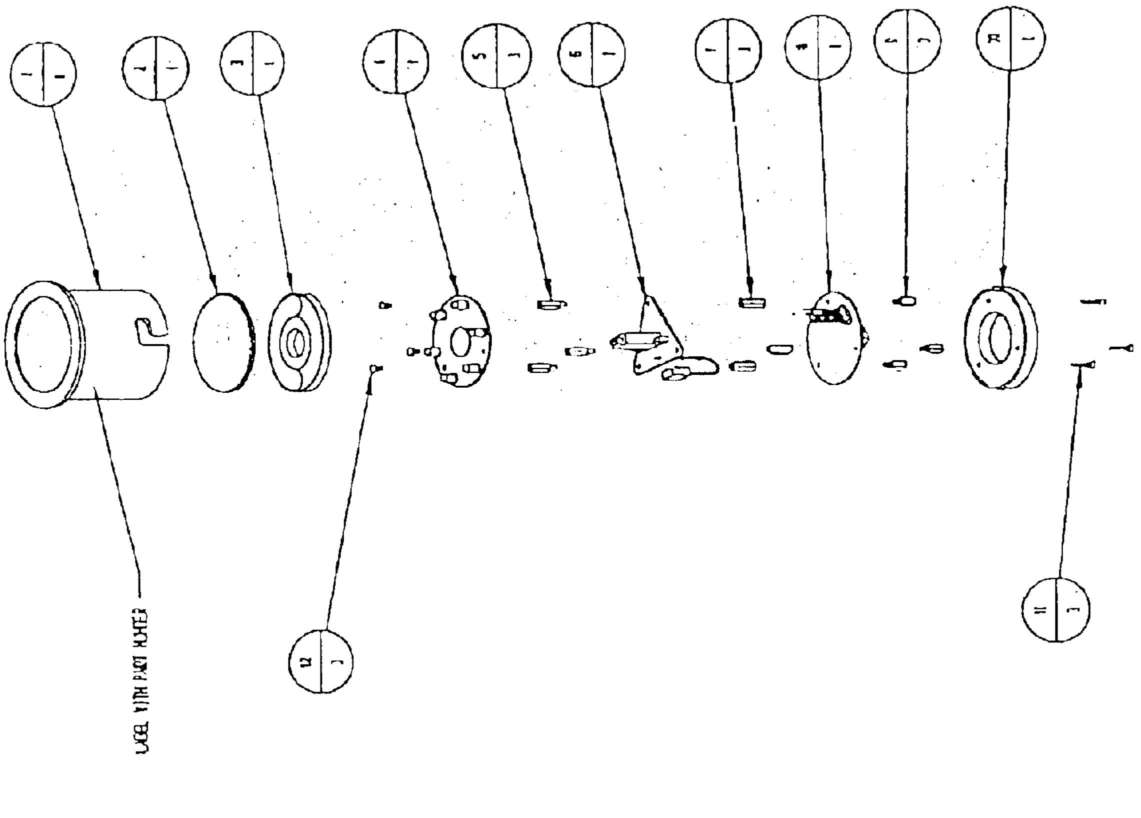
FIG. 10 is an exploded perspective view which shows the parts of an alternative suitable proximity sensor device.

With reference to FIG. 10, an alternative embodiment of the housing will be described. As shown in FIG. 10, this embodiment of the housing differs from that shown in FIG. 7 in that the housing includes a third board 147 for supporting the photoelectric sensor 144.

Figure 9:
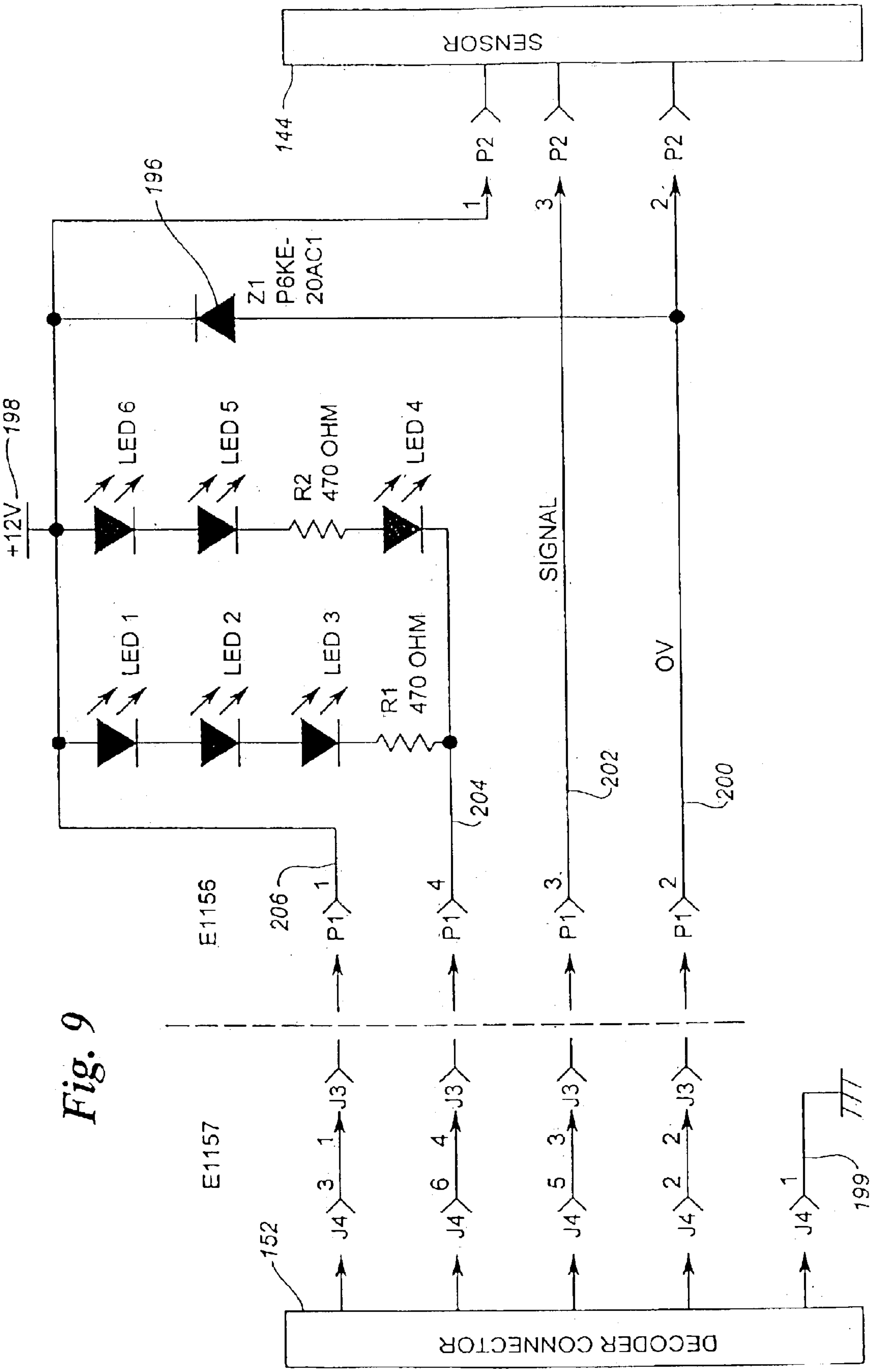
FIG. 9 is a circuit diagram of a proximity sensor device suitable for use in the present invention.

FIG. 9 shows the electrical connections between the sensor 144 and the decoder connector 152. There are five lines providing electrical connection from the decoder connector 152. One line 199 is connected to ground. Electrical lines 200, 202, 204, and 206 are connected to the photoelectric sensor 144 and the LEDs 146. As shown, the items on the first board 142 include the photoelectric sensor 144, the LEDs 146, and a Zener diode 196. The LEDs 146 and the photoelectric sensor 144 are connected to a twelve volt power supply 198. The Zener diode 196 allows electrical line 200 to have a constant voltage. When there is no object being sensed, the switch signal line 202 is at twelve volts. Once there is an object being sensed by the sensor 144, the switch signal 202 is driven to zero volts. This drop in voltage is transmitted via the decoder connector 152 to the microcontroller 90, where the microcontroller 90 determines that a gaming token has been sensed.

Electrical lines 204, 206 from the decoder connector 152 are connected to the two sets of three LEDs 146. This configuration will only prevent one set of three LEDs to not function if any one LED becomes defective. The microcontroller 90 may be able to detect when an LED is defective based on the voltage reading on line 206.

In operation, a player may choose to place a bet in area 23*a*–*g*, thereby entering the additional game of the multi-tiered wagering game. To place the bet, each player slides the gaming token onto the flush-mounted gaming token supporter 138. When the dealer locks in all the bets at the dealer control panel 70 using the "Begin Game" button 80, the microconrtroller 90 reads the outputs at the various photoelectric sensor devices 118 at each table 10. If there is no gaming token at a betting area 23*a*–*g* corresponding to a particular player position 18*a*–*g*, then the switching line 202, for the photoelectric sensor device 118 corresponding to the particular player position 18*a*–*g* is at twelve volts. When the microcontroller 90 reads a twelve volt signal on this line 202, the microcontroller 90 will determine that there is no gaming token at this betting area 23. However, if there is a gaming token placed in a betting area 23*a*–*g*, then the corresponding switch signal 202 will be zero volts and the microcontroller 90 will determine the presence of a gaming token and register the bet. Upon detecting the presence of a gaming token, the microcontroller 90 will enable the LEDs 146 to be lit. Also, this betting information will be sent to the facility computer 86 and the central computer 98.

After the game is played, if a player entered the additional game of the multitiered game, the keypad 74 will instruct the dealer to pay the player if he has a configuration of cards which requires a payout. After the game is played, the dealer may clear the gaming table by simply sweeping the gaming tokens of the table. Because the gaming token supporter 138 is flush mounted, the gaming token supporter 138 will not impede the dealer from clearing the table. The apparatus of the present invention allows the gaming token to be kept in circulation by the casino. Also, this apparatus accurately and reliably allows the detection of the presence of a gaming token in a particular betting area.

The present invention may be embodied in other specific forms without departing from the essential attributes thereof. It is desired that the embodiments described above be considered in all respects as illustrative, not restrictive, reference being made to the appended claims to indicate the scope of the invention.

What is claimed is:

1. A gaming apparatus, comprising:

(a) a gaming table with a gaming surface having at least one predetermined location for receiving a gaming token;

(b) a gaming token supporter mounted at each of the at least one predetermined location for receiving a gaming token on the gaming surface of the gaming table such that the gaming token supporter is flush with the gaming surface and forms a gaming token receiving location; and (c) a photoelectric sensor for each gaming token supporter, each photoelectric sensor providing modulated light emissions and sensing modulated light, and each photoelectric sensor being mounted to the gaming structure such that each sensor is aligned with and in sensing proximity to a gaining token supporter.

2. The apparatus of claim 1, wherein the gaming token supporter forms a portion of a sensor housing.

3. The apparatus of claim 2, wherein the sensor housing comprises a first board having a outer edge and at least one continuous inner edge, the inner edge forming a sensor holder, the sensor holder having dimensions such that a sensor can be received by the sensor holder and the sensor holder positioned such that the received sensor will be aligned and in sensing proximity to the gaming token supporter.

4. The apparatus of claim 3, wherein the sensor is formed by one of a photoelectric sensor and a non-photoelectric proximity sensor.

5. The apparatus of claim 3, further comprising a decoder electrically connected to each sensor for determining whether a gaming token is present at the gaming token location monitored by each sensor.

6. The apparatus of claim 5, wherein the first board comprises a plurality of continuous inner edges forming a plurality of holders, wherein a plurality of lighting devices may be received by the holders.

7. The apparatus of claim 6, wherein the lighting devices are connected to the decoder.

8. The apparatus of claim 5, wherein the decoder is a microcontroller.

9. The apparatus of claim 5, wherein the decoder is a hard wired circuit.

10. An apparatus for playing a multi-tiered game, comprising:

(a) a plurality of gaming tables, each table having a plurality of play positions;

(b) wagering areas on the table, with at least one wagering area corresponding to each of the plurality of player positions;

(c) a gaming token supporter flush mounted to the gaming surface to form a wagering area;

(d) sensor means mounted to the plurality of gaming tables, wherein each sensor means comprises a photoelectric sensor providing modulated light emissions and sensing modulated light, and each photoelectric sensor being mounted to the gaming structure such that at least one sensor is aligned with and in sensing proximity to a gaming token supporter;

(e) dealer control means at each table, connected to the sensor means, for determining whether a gaming token is present in each of the plurality of wagering areas, accumulating the betting information from each plurality of sensor means, and entering data on winning outcomes in the multi-tiered game, wherein the dealer control means includes means for entering a security code prior to entering data on winning outcomes, a plurality of inputs, each input designating one of a plurality of winning outcomes and one of the plurality of player positions at a gaming table of the multi-tiered game; and (f) computer means operably connected to each dealer control means for continuously accumulating the betting information and winning outcome data for the multi-tiered game, calculating a prize amount for the multi-tiered game, and controlling a display means operably connected to the computer means for displaying the prize amount for the multi tiered game.

11. The apparatus of claim 10, wherein the plurality of gaming tables is located at different gaming facilities.

12. The apparatus of claim 11, wherein the computer means includes a plurality of facility computers, each facility computer operably connected to a plurality of gaming tables, and a central computer operably connected to the plurality of facility computers.

13. The apparatus of claim 12, wherein the display means includes an alphanumeric LED display.

14. The apparatus of claim 11, wherein the dealer control means, computer means, and display moans are operably connected to each other by a local network.

* * * * *